(12) United States Patent
Alamir et al.

(10) Patent No.: US 11,977,872 B2
(45) Date of Patent: May 7, 2024

(54) METHOD AND SYSTEM FOR CODE MAINTENANCE

(71) Applicant: JPMorgan Chase Bank, N.A., New York, NY (US)

(72) Inventors: Salwa Husam Alamir, Bournemouth (GB); Sameena Shah, White Plains, NY (US); Andrea Stefanucci, Hoboken, NJ (US); Maria Manuela Veloso, Pittsburgh, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/165,207

(22) Filed: Feb. 2, 2021

(65) Prior Publication Data
US 2022/0244938 A1    Aug. 4, 2022

(51) Int. Cl.
| | | |
|---|---|---|
| G06F 9/44 | (2018.01) | |
| G06F 8/65 | (2018.01) | |
| G06F 40/40 | (2020.01) | |
| G06N 20/00 | (2019.01) | |

(52) U.S. Cl.
CPC .............. *G06F 8/65* (2013.01); *G06F 40/40* (2020.01); *G06N 20/00* (2019.01)

(58) Field of Classification Search
CPC ........................................................ G06F 8/65
USPC ........................................................ 717/168
See application file for complete search history.

(56) References Cited

U.S. PATENT DOCUMENTS

| | | | |
|---|---|---|---|
| 5,812,848 A * | 9/1998 | Cohen | G06F 8/54 |
| | | | 719/331 |
| 9,454,384 B2 * | 9/2016 | Winter | G06F 9/44505 |
| 9,727,441 B2 * | 8/2017 | Agarwal | G06F 11/3612 |
| 10,108,410 B2 * | 10/2018 | Mahajan | H04L 67/34 |
| 10,114,637 B1 * | 10/2018 | Willson | G06F 8/71 |
| 10,311,500 B2 * | 6/2019 | Williams | G06Q 50/01 |
| 10,977,030 B2 * | 4/2021 | Weldemariam | G06F 11/3604 |
| 10,996,944 B2 * | 5/2021 | Gupta | G06F 17/16 |
| 2007/0038983 A1 * | 2/2007 | Stienhans | G06F 8/70 |
| | | | 717/127 |
| 2008/0184212 A1 * | 7/2008 | Lee | G06F 9/45525 |
| | | | 717/148 |
| 2015/0106887 A1 * | 4/2015 | Aslund | H04L 63/0861 |
| | | | 726/5 |
| 2021/0232377 A1 * | 7/2021 | Bae | G06F 21/51 |
| 2022/0244938 A1 * | 8/2022 | Alamir | G06F 8/36 |

* cited by examiner

*Primary Examiner* — Evral E Bodden
(74) *Attorney, Agent, or Firm* — GREENBLUM & BERNSTEIN, P.L.C.

(57) ABSTRACT

A method for updating code in a shared codebase is provided. The method includes: using artificial intelligence techniques to generate a network graph that indicates a set of dependencies between a plurality of code modules included in the shared codebase; receiving information that relates to updating a first code module from among the plurality of code modules; and determining, based on the network graph, a subset of the plurality of code modules to be impacted when the first code module is updated. The method may further include scanning release notes associated with the shared codebase, and using natural language processing techniques to determine functions that will be impacted by the update.

14 Claims, 8 Drawing Sheets

METHOD AND SYSTEM FOR CODE MAINTENANCE

BACKGROUND

1. Field of the Disclosure

This technology generally relates to methods and systems for maintaining and updating software, and more particularly to using artificial intelligence techniques to maintain and update software code in a shared codebase.

2. Background Information

Using a shared codebase has benefits and drawbacks. Reusable code generally accelerates the software development process. However, reusable code also creates a dependency on scripts of which developers may not be aware. Thus, updating a script may cause downstream issues, and upgrading libraries may require entire migration projects that are time consuming, tedious, lengthy; and costly.

Conventionally, maintaining a codebase by updating scripts, libraries and language versions is performed manually. Accordingly, there is a need for a method for automating the process of maintaining a shared codebase.

SUMMARY

The present disclosure, through one or more of its various aspects, embodiments, and/or specific features or sub-components, provides, inter alfa, various systems, servers, devices, methods, media, programs, and platforms for using artificial intelligence techniques to maintain and update software code in a shared codebase.

According to an aspect of the present disclosure, a method for updating software code in a shared codebase is provided. The method is implemented by at least one processor. The method includes: generating, by the at least one processor, a network graph that indicates a set of dependencies between a plurality of code modules included in the shared codebase; receiving, by the at least one processor, information that relates to updating a first code module from among the plurality of code modules; and determining, by the at least one processor based on the network graph, a subset of the plurality of code modules to be impacted when the first code module is updated.

The method may further include: scanning, by the at least one processor, a plurality of release notes associated with the shared codebase; and determining, by the at least one processor based on a result of the scanning, at least one function to be changed within the determined subset of the plurality of code modules by using a natural language processing (NLP) technique.

The method may further include automatically updating each of the first code module and the determined subset of the plurality of code modules.

The method may further include: generating a message that includes information relating to a result of the determining; and transmitting the generated message to a user.

The message may include an indication that human intervention is required fir updating at least one portion of the determined subset of the plurality of code modules.

The determined subset of the plurality of code modules may include at least one library module that relates to at least one other code module within the determined subset of the plurality of code modules.

The information that relates to updating the first code module may include information that relates to a language version of the first code module.

The generating of the network graph may include using an artificial intelligence technique to determine the set of dependencies.

The method may further include: identifying at least one additional codebase to be impacted when the first code module is updated; and generating a notification message that includes a recommendation to update the identified at least one additional codebase.

According to another exemplary embodiment, a computing apparatus for updating code in a shared codebase is provided. The computing apparatus includes a processor; a memory; and a communication interface coupled to each of the processor and the memoir. The processor is configured to: generate a network graph that indicates a set of dependencies between a plurality of code modules included in the shared codebase, receive, via the communication interface, information that relates to updating a first code module from among the plurality of code modules; and determine, based on the network graph, a subset of the plurality of code modules to be impacted when the first code module is updated.

The processor may be further configured to: scan a plurality of release notes associated with the shared codebase; and determine, based on a result of the scan, at least one function to be changed within the determined subset of the plurality of code modules by using a natural language processing (NLP) technique.

The processor may be thither configured to automatically update each of the first code module and the determined subset of the plurality of code modules.

The processor may be further configured to generate a message that includes information relating to a result of the determination, and to transmit the generated message to a user via the communication interface.

The message may include an indication that human intervention is required for updating at least one portion of the determined subset of the plurality of code modules.

The determined subset of the plurality of code modules may include at least one library module that relates to at least one other code module within the determined subset of the plurality of code modules.

The information that relates to updating the first code module may include information that relates to a language version of the first code module.

The processor may be further configured to generate of the network graph by using an artificial intelligence technique to determine the set of dependencies.

The processor may be further configured to identify at least one additional codebase to be impacted when the first code module is updated, and to generate a notification message that includes a recommendation to update the identified at least one additional codebase.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
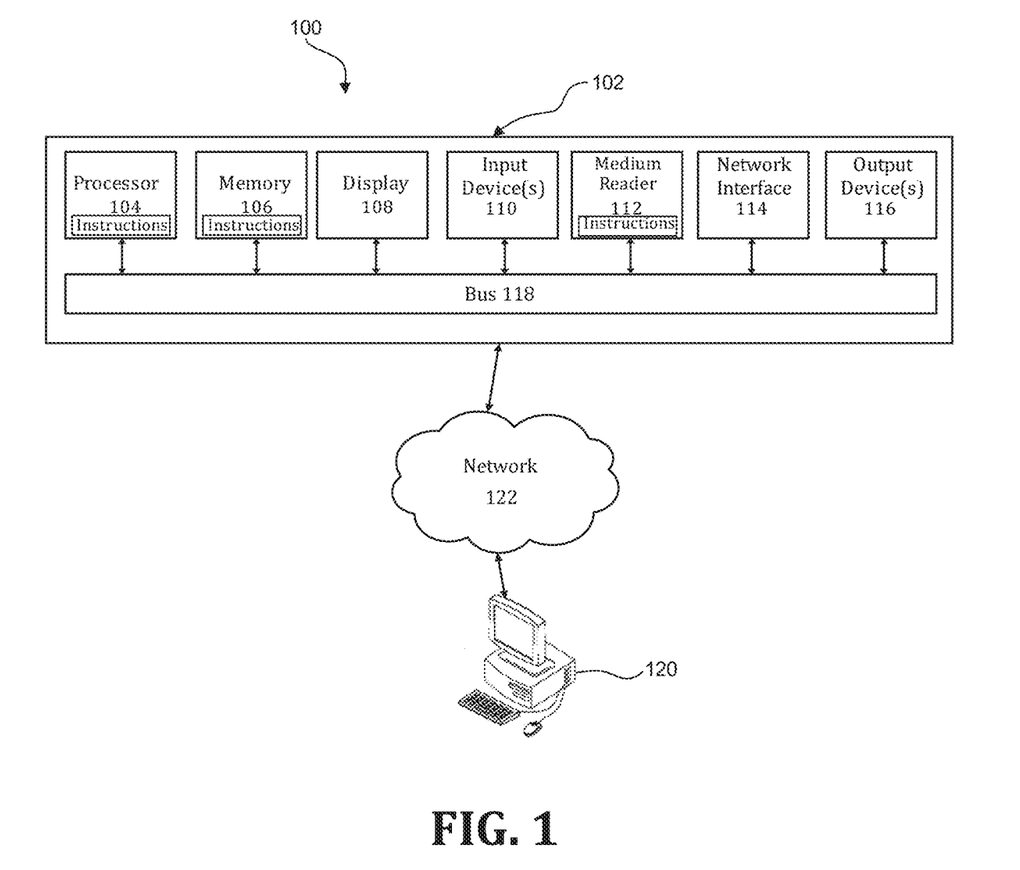
FIG. 1 illustrates an exemplary computer system.

FIG. 1 is an exemplary system for use in accordance with the embodiments described herein. The system 100 is generally shown and may include a computer system 102, Which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer a laptop computer, a desktop computer, a communications device, a wireless smart phone, a personal trusted device, a wearable device, a global positioning satellite (CPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC), The processor 104 may also be a microprocessor: a microcomputer, a processor chip, a controller, a microcontroller, a digital signal processor (PSP), a state machine, or a programmable logic device. The processor 104 may also be a logical circuit, including programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory; or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last fir a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory; electrically programmable read only memory (EPROM), electrically erasable programmable read-only memory (EEPROM), registers, a hard disk, a cache, a removable disk, tape, compact disk read only memory (CD-ROM), digital versatile disk (DVI)), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display; a solid state display; a cathode ray tube (CRT), a plasma display, or any other type of display; examples of which are well known to skilled persons.

The computer system 102 may also include at least one input device 110, such as a keyboard, a touch-sensitive input screen or pad, a speech input, a mouse, a remote control device having, a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alters alive, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely; or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the att. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of deices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary; non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using artificial intelligence techniques to maintain and update software code in a shared codebase.

Figure 2:
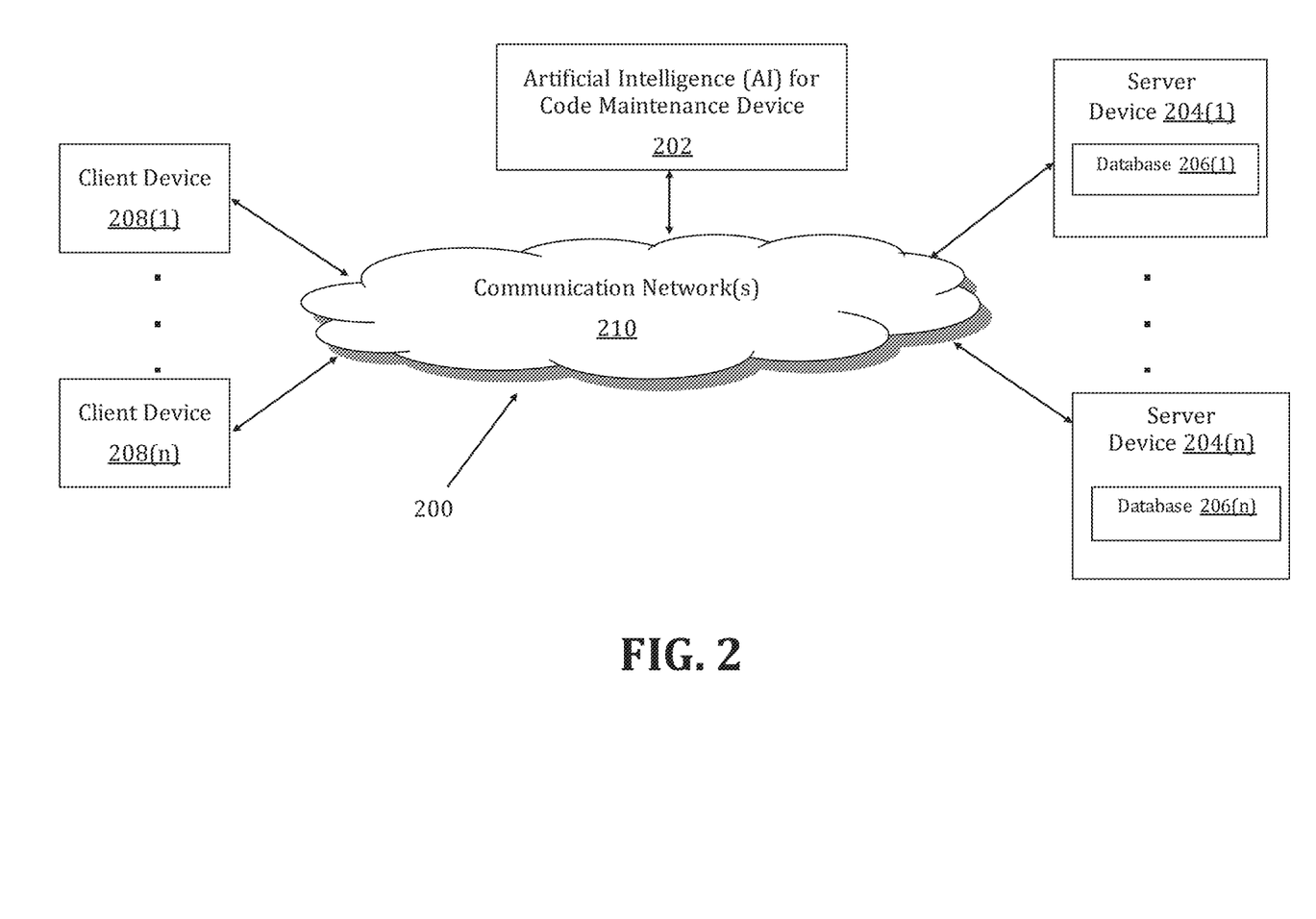
FIG. 2 illustrates an exemplary diagram of a network environment.

Referring to FIG. 2, a schematic of an exemplary network environment 200 for implementing a method for using artificial intelligence techniques to maintain and update software code in a shared codebase is illustrated. In an exemplary embodiment, the method is executable on any networked computer platform, such as, for example, a personal computer (PC).

The method for using artificial intelligence techniques to maintain and update software code in a shared codebase may be implemented by an Artificial Intelligence (AI) for Code Maintenance (AICM) device 202. The AICM device 202 may be the same or similar to the computer system 102 as described with respect to FIG. 1. The AICM device 202 may store one or more applications that can include executable instructions that, when executed by the AICM device 202, cause the ATIM device 202 to perform actions, such as to transmit, receive, or otherwise process network messages, far example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AICM device 202 itself may be located in virtual server(s) running in a cloud-based computing environment rather than being tied to one or more specific physical network computing devices. Also, the application(s) may be running in one or more virtual machines (VMs) executing on the AICM device 202. Additionally; in one or more embodiments of this technology, virtual machine(s) running on the AICM device 202 may be managed or supervised by a hypervisor.

In the network environment 200 of FIG. 2, the AICM device 202 is coupled to a plurality of server devices 204(1)-204(n) that hosts a plurality of databases 206(1)-206(n), and also to a plurality of client devices 208(1)-208(n) via communication network(s) 210. A communication interface of the MEM device 202, such as the network interface 114 of the computer system 102 of FIG. 1, operatively couples and communicates between the AICM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AICM device 202, the server devices 204(1)-204(n), and/or the client devices 208(1)-208(n) may be coupled together via other topologies. Additionally; the network environment 200 may include other network devices such as one or more routers and/or switches, for example, which are well known in the art and thus will not be described herein. This technology provides a number of advantages including methods, non-transitory computer readable media, and AICM devices that efficiently implement a method for using artificial intelligence techniques to maintain and update software code in a shared codebase.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTN s), Ethernet-based Packet Data Networks (PDNs), combinations thereof, and the like.

The MEM device 202 may be a standalone device or integrated with one or more other devices or apparatuses, such as one or more of the server devices 204(1)-204(n), for example. In one particular example, the AICM device 202 may include or be hosted by one of the server devices 204(1)-204(n), and other arrangements are also possible. Moreover, one or more of the devices of the AICM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AICM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to historical code and library versions and updates and shared codebase dependencies.

Although the server devices 204(1)-204(n) are illustrated as single devices, one or more actions of each of the server devices 204(1)-204(t) may be distributed across one or more distinct network computing devices that together comprise one or more of the server devices 204(1)-2040). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, tier example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AWM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AICM device 202 via the communication network(s) 210 in order to communicate user requests and information. The client devices 208(l)-208(n) may further include, among other features, a display device, such as a display screen or touchscreen, and/or an input device, such as a keyboard, example.

Although the exemplary network environment 200 with the AICM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AICM device 202, the server devices 204(1)-204(n), or the client devices 208(1)-208(n), for example, may be configured to operate as virtual instances on the same physical machine. In other words, one or more of the AICM device 202, the server devices 204(1)-204(n), or the client devices 208(l)-208(n) may operate on the same physical device rather than as separate devices communicating through communication network(s) 210. Additionally, there may be more or fewer AICM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
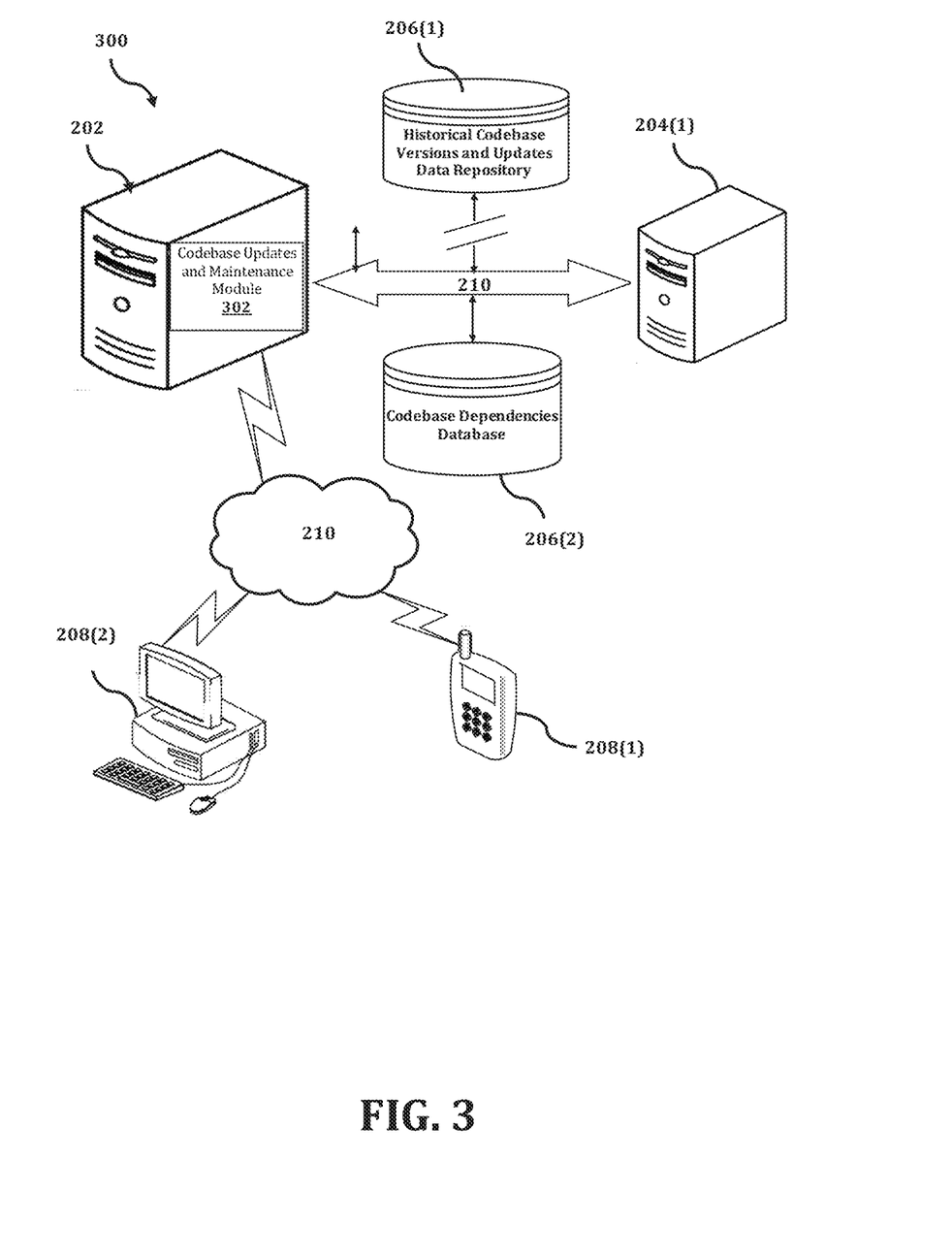
FIG. 3 shows an exemplary system for implementing a method for using artificial intelligence techniques to maintain and update software code in a shared codebase.

The AICM device 202 is described and illustrated in FIG. 3 as including a codebase updates and maintenance module 302, although it may include other rules, policies, modules, databases, or applications, for example. As will be described below; the codebase updates and maintenance module 302 is configured to implement a method for using artificial intelligence techniques to maintain and update software code in a shared codebase.

An exemplary process 300 for implementing a mechanism for using artificial intelligence techniques to maintain and update software code in a shared codebase by utilizing the network environment of FIG. 2 is illustrated as being executed in FIG. 3. Specifically, a first client device 208(1) and a second client device 208(2) are illustrated as being in communication with AICM device 202. In this regard, the first client device 208(1) and the second client device 208(2) may be "clients" of the AICM device 202 and are described herein as such. Nevertheless, it is to be known and understood that the first client device 208(1) and/or the second client device 208(2) need not necessarily be "clients" of the AICM device 202, or any entity described in association therewith herein. Any additional or alternative relationship may exist between either or both of the first client device 208(1) and the second client device 208(2) and the AICM device 202, or no relationship may exist.

Further, AICM device 202 is illustrated as being able to access a historical codebase versions and updates data repository 206(1) and a codebase dependencies database 206(2). The codebase updates and maintenance module 302 may be configured to access these databases for implementing a method for using artificial intelligence techniques to maintain and update software code in a shared codebase.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AICM device 202 via broadband or cellular communication. Of course, these embodiments are merely exemplary and are not limiting or exhaustive.

Upon being started, the codebase maintenance and updates module 302 executes a process for using artificial intelligence techniques to maintain and update software code in a shared codebase. An exemplary process for using artificial intelligence techniques to maintain and update software code in a shared codebase is generally indicated at flowchart 400 in FIG. 4.

Figure 4:
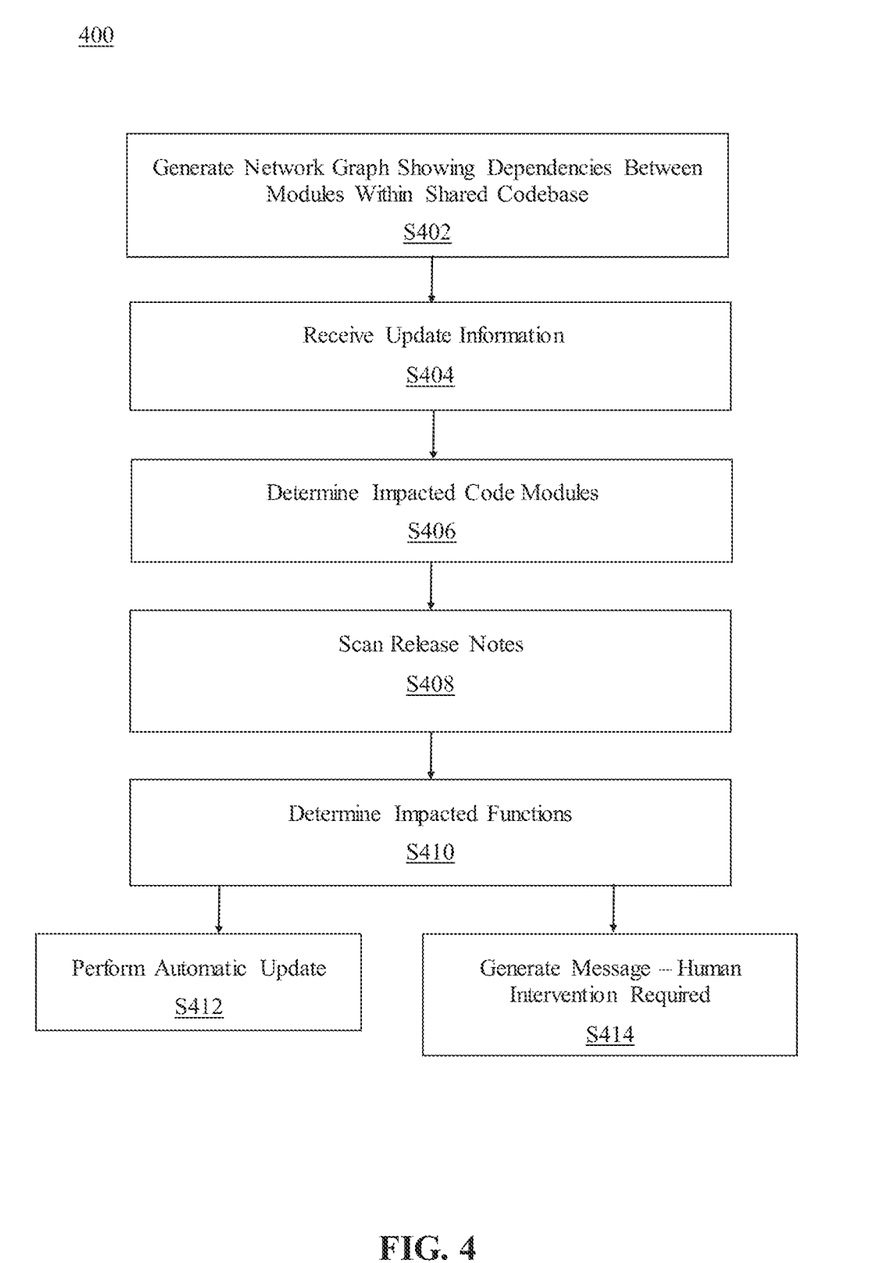
FIG. 4 is a flowchart of a first process for implementing a method for using artificial intelligence techniques to maintain and update software code in a shared codebase, according to an exemplary embodiment.

In process 400 of FIG. 4, at step S402, the codebase maintenance and updates module 302 generates a network graph that indicates a set of dependencies between code modules included within a shared codebase. In an exemplary embodiment, the dependencies are determined by using one or more artificial intelligence techniques.

At step S404, the codebase maintenance and updates module 302 receives information indicating that a particular code module needs to be updated. For example, a library may require an update, a newly released version of a software module may have been released, and/or a language version of a portion of the codebase may require an update.

At step S406, the codebase maintenance and updates module 302 determines which code modules are impacted by the planned update. In an exemplary embodiment, the determination of impacted code modules is based on the network graph that shows dependencies between code modules within the shared codebase generated in step S402.

At step S408, the codebase maintenance and updates module 302 scans release notes that are associated with the code modules determined as being impacted in step S406. Then, in step S410, the codebase maintenance and updates module 302 determines which functions will be changed and identifies areas within the code that will require updating. In an exemplary embodiment, the determination of functions that are impacted is performed by using one or more natural language processing (NLP) techniques with respect to the scanned release notes.

In some instances, the code updates may be performed automatically. In these cases, at step S412, the codebase maintenance and updates module 302 automatically executes the updates. When there is at least one update that requires human intervention, at step S414, the codebase maintenance and updates module 302 generates a message indicating a result of the determination of impacted code modules and that human intervention is required, and transmits this message to a user.

In an exemplary embodiment, the codebase maintenance and updates module 302 may identify other shared codebases that are impacted by the planned update as indicated by the information received in step S404. In this circumstance, the codebase maintenance and updates module 302 may generate and transmit a notification message that includes a recommendation to update the additionally identified codebases.

In an exemplary embodiment, artificial intelligence (AI) techniques are used in order to automatically update code, this is particularly useful in the context of a shared codebase. A shared code-base has both benefits and drawbacks. Re-usable code makes development faster, but it may cause a dependency on scripts of which developers may not be aware. Thus, updating a script may cause downstream issues, and upgrading libraries often requires entire migration projects.

Why are code updates needed? Code needs to be updated for a number of reasons: 1) Bug fixes: New versions of libraries have patches or bugfixes that have been resolved. This includes bugs that have impaired functionality of a method, but also includes security holes within the code. Thus it is important to regularly update code in order to prevent malware. The security holes become highlighted in the release notes when a new version is released, making it easier to use. 2) Performance Improvements: New versions of libraries have performance improvements. Some of the same methods may have a better performance such that running the updated version achieves less time and space complexity. This could improve overall performance of an application. 3) New Features: New versions of libraries have new features. What once required more verbose code could now have a function built-in to the library fix handling thereof 4) Support: Older libraries will stop being supported. Thus for maintainability of code, it is important to keep updating the code.

Another potential factor is retention of top talent within an organization. The best technologists generally have a preference to work on newer technologies. If the code or libraries become outdated, the pool of elite developers willing to work on them will likely reduce.

Challenges with a shared codebase: A shared codebase is defined herein as a codebase that is contained in a single repository and encompasses multiple projects. A shared codebase has many advantages, but also challenges that are outlined F.

Visibility: The code is both viewable and searchable by all developers in the organization. However, the challenge here is implementing a search algorithm such that it is simple and quick for developers to locate a piece of code they need.

Synchronization: If the development process is trunk-based (i.e., following a "Gitflow" model), developers commit to the head of the repository. This means that all of the developers have the latest versions of code, but the challenge of code breaks due to updates becomes more apparent. Some updates require large-scale refactoring which is currently being completed manually.

3) Standardization: A shared set of tooling governs how software engineers develop code. This covers all stages of the software development life-cycle (SID), including building, testing, and peer reviewing code, One challenge may arise when a relatively large shared codebase does not use the latest SDLC tools.

4) Re-sharing: Developers are able to complete extensive code sharing and reuse, which saves development time and effort. Another advantage is that re-sharing also creates a collaborative environment, with collaboration happening across different teams, and the boundaries of code ownership become more flexible. However, this code sharing may also create dependencies that are not tracked. In an exemplary embodiment, this issue is alleviated by facilitating an understanding of the dependencies between scripts.

Figure 5:
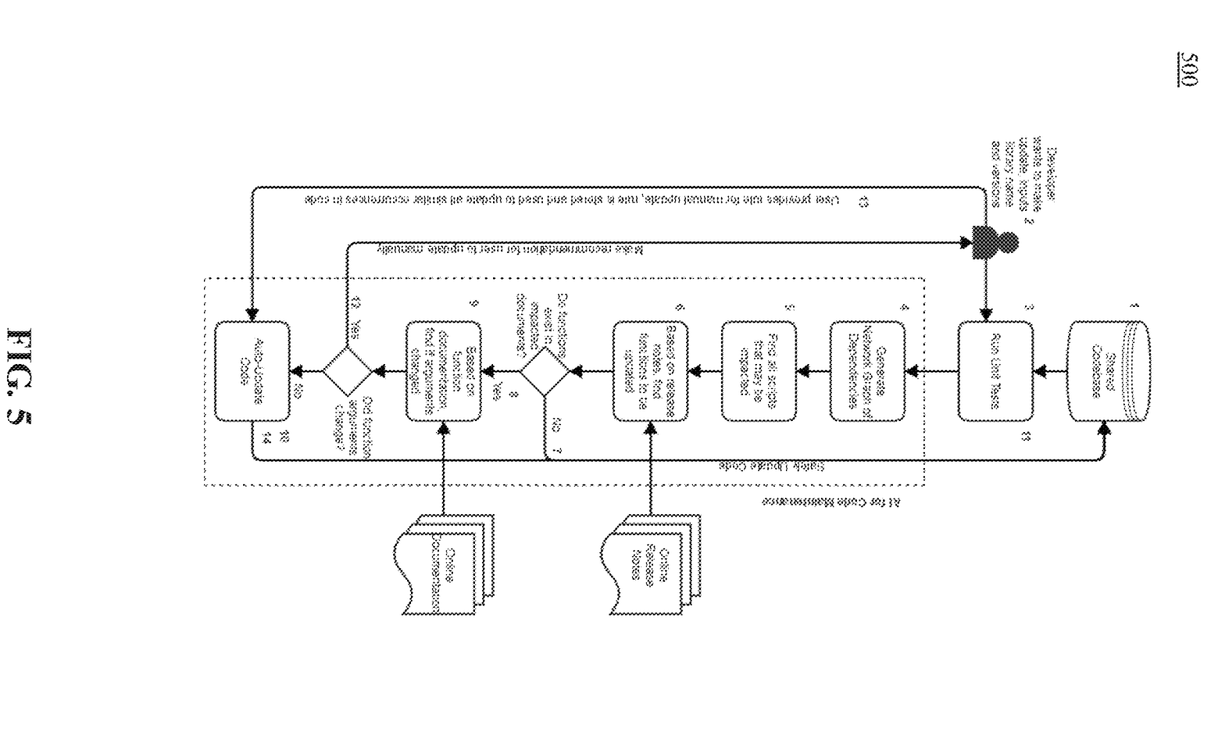
FIG. 5 is a flowchart of a second process for implementing a method for using artificial intelligence techniques to maintain and update software code in a shared codebase, according to an exemplary embodiment.

FIG. 5 is a flowchart 500 of a second process for implementing a method for using artificial intelligence techniques to maintain and update software code in a shared codebase, according to an exemplary embodiment.

Research Question: In an exemplary embodiment, a broader research question to be addressed is how an automated AI system can understand code dependencies and update code accordingly, freeing up developer's time that can be otherwise spent writing code. A proposed approach to a solution is addressed below.

Solution: A proposed approach in accordance with an exemplary embodiment follows the architecture depicted in FIG. 5. In summary, by accessing any code-base, a network graph of dependencies showing how all of the scripts are inter-related may be created. Based on this network, a user will be able to know which scripts will be impacted by any changes. Therefore, rather than manually updating code as an entire project, libraries can automatically be updated by scanning the release notes and using natural language processing techniques to 1) determine what functions have changed; and 2) to locate the areas of code that need updating.

The solution can then replace the code automatically, or recommend to users a replacement for approval. After replacing the code, the unit tests will be run and automatically in order to verify the update was completed successfully. Referring to FIG. 5, the following is a detailed outline of the solution based on the numbering shown in FIG. 5:

1) A shared codebase is provided.

2) A developer inputs the name of a library that needs to be updated, the current version, and the desired version.

3) The unit tests are run based on the new library. Failure due to deprecations is likely.

4) A network graph of dependencies is generated by using the import statements of each script.

5) The network graph is traversed in order to find all of the scripts that have a dependency on the library, and all of the scripts that have a dependency on those scripts. These are now all the scripts that may be impacted by an upgrade.

6) Release notes are obtained fix the library. Every updated version of code has release notes that show the latest changes from the previous version, also referred to herein as the "delta change." As only the delta change is provided, all release notes between the two versions provided by the user must be examined. From these, the deprecated functions may be extracted.

7) A search for the deprecated functions within the codebase is performed. If none of the deprecated functions exist in the code, it is safe to update the libraries.

8) If the deprecated functions exist in the code, documentation on the old version and the new version is obtained in order to extinct the function signatures.

9) The documentation is parsed in order to extract the function's input and output arguments (i.e., function signature).

10) A check as to whether the function signatures match or whether they have changed is performed. If the input and output arguments of a function have not changed, then the code may safely be updated, thus reinitiating the unit tests.

11) The unit tests for the updated functions should now pass.

12) If the input and output arguments of a function have changed, then a manual approach is recommended to the user.

13) The user will have the ability to manually specify an update rule.

14) The user's update rule will be stored and used to update all similar occurrences within the codebase.

Code Dependencies: The scripts are treated like strings and every line with "import" is extracted. Based on various ways of completing an import, rules for extracting the library being imported are created. For example, a library A can be imported in several ways: 1) import A; 2) from A import B; 3) from A.B import C.

In an exemplary embodiment, it may be detected that library A is the one that needs to be included in the nets network graph. However, if the script being imported is within the codebase, then the process stops at the file level. For example, the following is a sequence for extracting the file from the import statements: 1) import file; 2) from project import file; 3) from project.file import function; 4) from project.folder.file import function.

Based on this, a mapping for each file and every file or library it is importing is generated. These mappings may then be used to generate a network graph which can then be traversed. In an exemplary embodiment, the network graph may be created by using the Networkx library.

Figure 6:
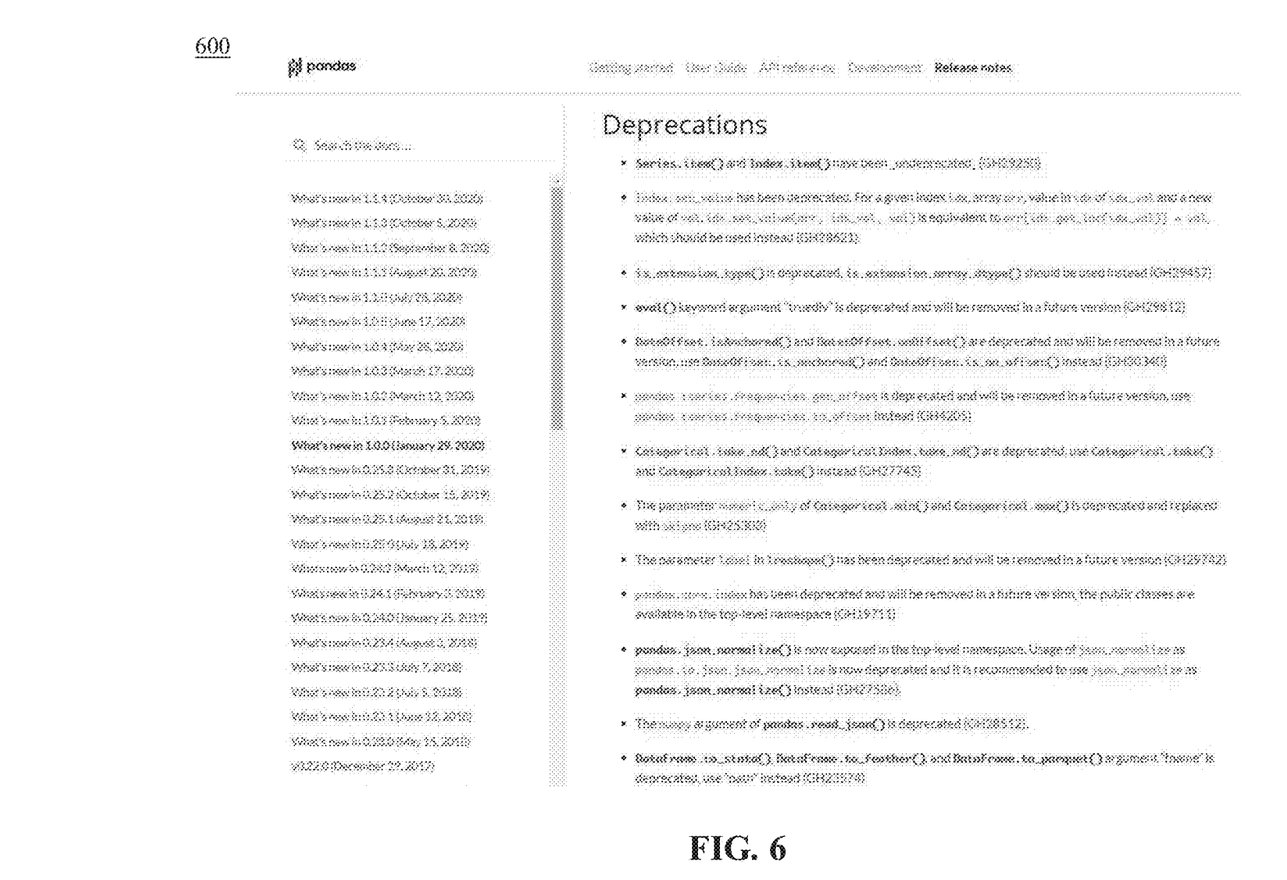
FIG. 6 is a list of a release notes deprecations section that is generated during execution of a method for using artificial intelligence techniques to maintain and update software code in a shared codebase, according to an exemplary embodiment.

FIG. 6 is a release notes deprecations section 600 that is generated during execution of a method for using artificial intelligence techniques to maintain and update software code in a shared codebase, according to an exemplary embodiment.

Release Notes Parser: In an exemplary embodiment, the release notes are treated as an HTML string. Many libraries may use a product called Sphinx in order to automatically generate documentation. This means that the release notes have a standardized HTML across different libraries, including class names. The documentation uses class "code" to refer to functions. An example of a list of release notes 600 is shown in FIG. 6.

In an exemplary embodiment, all list items is that fall under a header on the page that contains the word "Deprecation" are extracted. In one approach, for each list item, the word "deprecated" is used for splitting the item and extracting the elements with class "code" before and after the word "deprecated." This works for all instances that follow the format "Function A is deprecated, use function B instead," and was even adapted to work for "Functions A and B have been deprecated, use functions C and D instead," for unlimited number of functions on either side of the word "deprecated."

Functions Parser: In order to obtain the input and output arguments of the functions that have changed, the documentation of the function must first be obtained. In an exemplary embodiment, this may be implemented by creating a Google search of the function name, library name, and library version via an application programming interface (API) call, and then extracting the Uniform Resource Locator (URL) of the function documentation from the HyperText Markup Language (HTML) string that is returned. This API call is completed twice, once passing the old library version, and one passing the new one. Both URLs are stored to be displayed to the user in order to show the documentation supporting the decision of the model.

After extracting the two URLs, a separate API call is made to each URL in order to obtain the documentation for both the old and new versions of the function. In an exemplary embodiment, when the documentation is generated by Sphinx, the standardized format that is created by extracting the parameters that are always present within a "table" on the page may be used: By comparing the parameters, a determination as to whether the update can be completed based on whether or not the tables match may be made.

Figure 7:
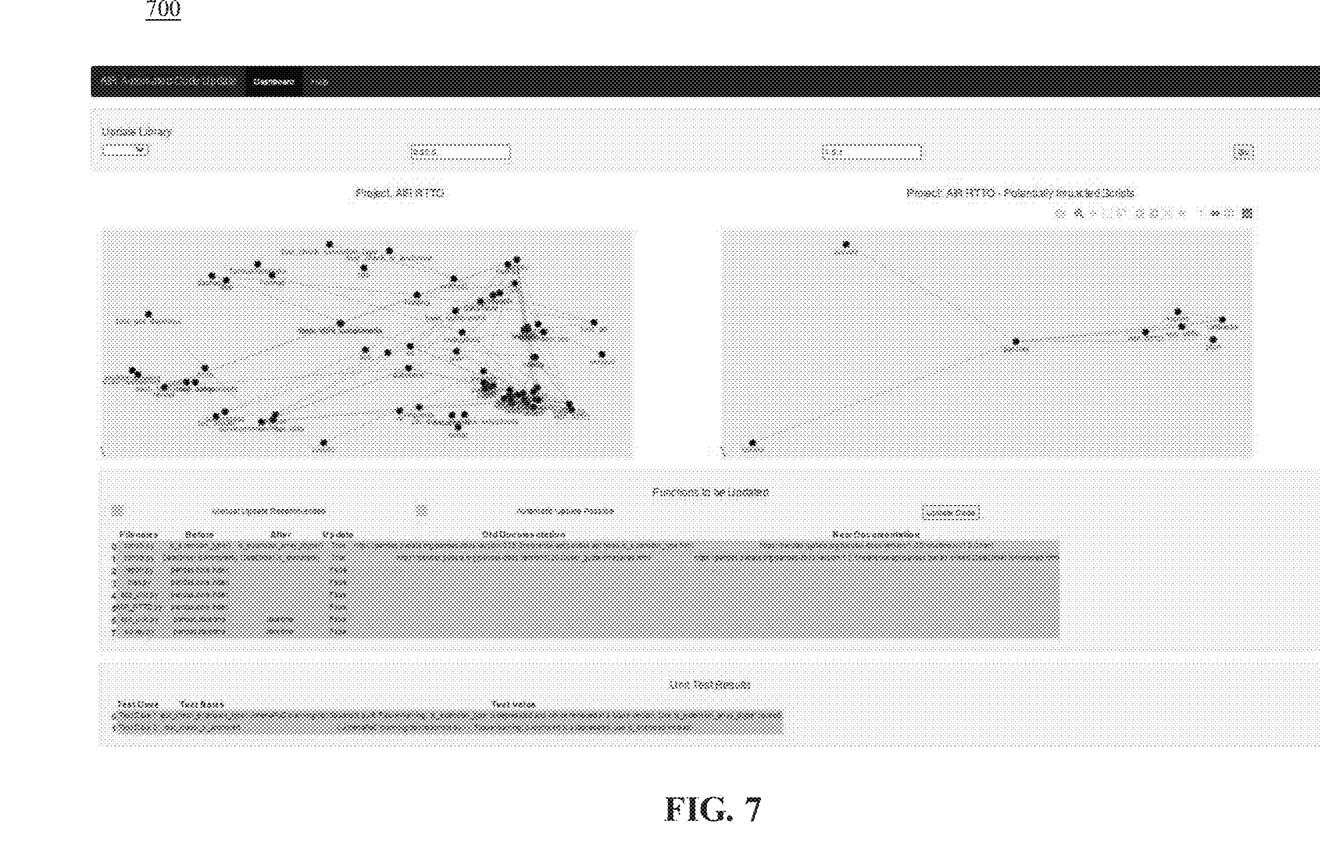
FIG. 7 is a first screenshot of a user interface that facilitates execution of a method for using artificial intelligence techniques to maintain and update software code in a shared codebase, according to an exemplary embodiment.
Figure 8:
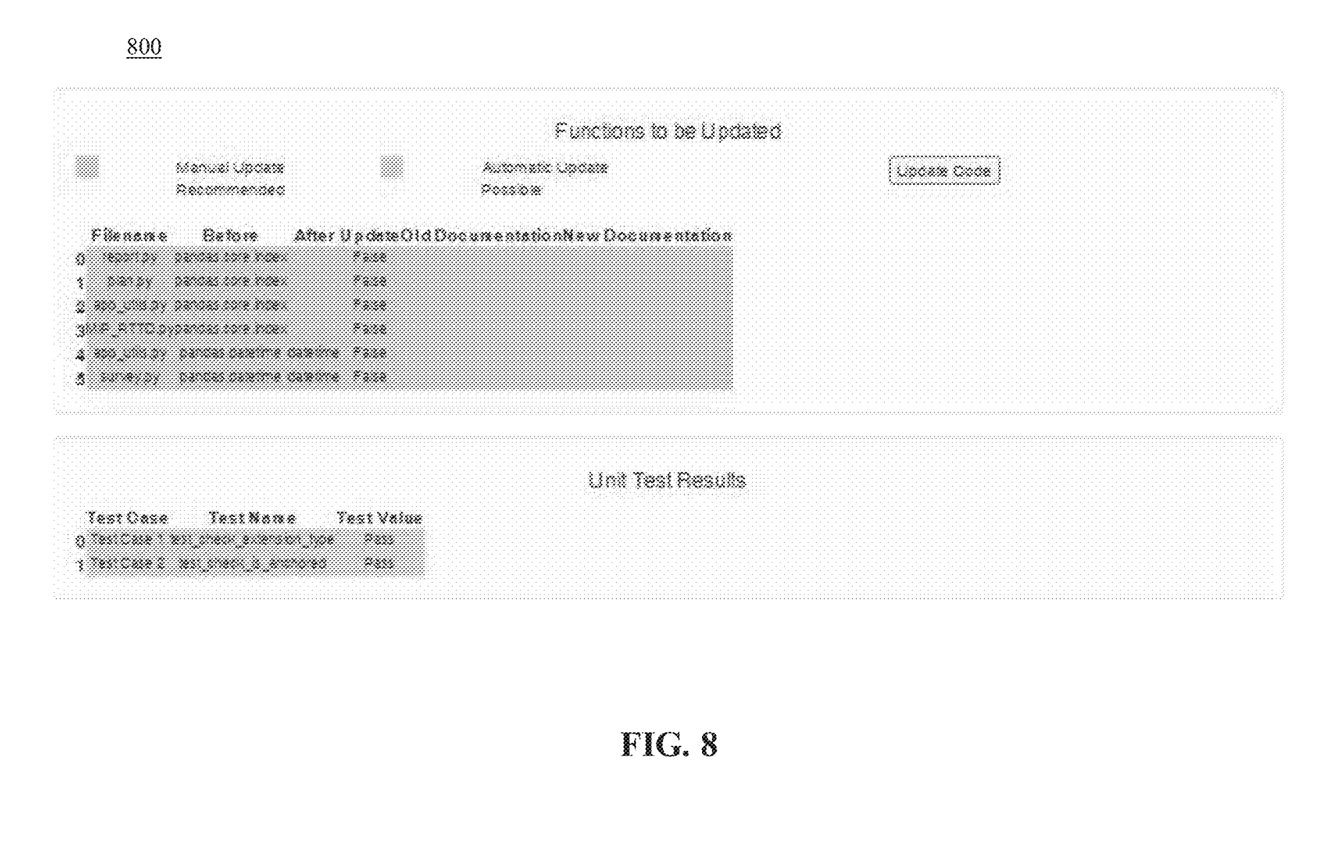
FIG. 8 is a second screenshot of a user interface that facilitates execution of a method for using artificial intelligence techniques to maintain and update software code in a shared codebase, according to an exemplary embodiment.

FIG. 7 is a first screenshot 700 of a user interface that facilitates execution of a method for using artificial intelligence techniques to maintain and update software code in a shared codebase, according to an exemplary embodiment. FIG. 8 is a second screenshot 800 of a user interface that facilitates execution of a method for using artificial intelligence techniques to maintain and update software code in a shared codebase, according to an exemplary embodiment.

User Interface: A user may operate the model onto their application. As shown in at the top of screenshot 700 in FIG. 7, the user can select the library to update from a dropdown list. The user should then proceed to type the version of the library they have, and the version to which they want to upgrade. When they click on "Go," the next portion of the page will update with two charts. One is the entire network graph of dependencies far the project, and the second is the impacted scripts that have a dependency on the specified library and may fail as a result of an upgrade.

By running the code on the updated version, the outputs are obtained and displayed in the box titled "Functions to be Updated." This box shows all of the scripts that have a piece of code that was detected to be deprecated. The scripts that can be automatically updated based on the model with the URLs to the supporting documents provided may be highlighted, for example, by using color coding. Similarly, the ones that are recommended for a user to update manually may also be highlighted by using color coding. Iii an exemplary embodiment, the scripts that are automatically updatable may be highlighted in green, and the scripts for which manual updating is recommended may be highlighted in red.

In the box titled "Unit Test Results," tests that have failed and tests that have passed are shown, and in an exemplary embodiment, the failed tests may be distinguished from the passed tests by using color coding (e.g., red for a failed test and green for a passed test). The initial run shows that the unit tests in the example illustrated in FIG. 7 have failed as a result of deprecation errors.

If the user clicks on the "update Code" button, then the code is updated and unit tests are re-run. As illustrated in the screenshot 800 of FIG. 8, it may be seen that the unit tests have passed as a result of the code update. Also in the section titled "Functions to be Updated," the two items that previously were shown as being automatically updatable have disappeared as they have already been updated, and what remain are the items that require a manual update by the user.

Accordingly; with this technology, an optimized process for using artificial intelligence techniques to maintain and update software code in a shared codebase is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medic m can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly; the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly; the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for updating code in a shared codebase, the method being implemented by at least one processor, the method comprising:
    generating, by the at least one processor, a network graph that indicates a set of dependencies between a plurality of code modules included in the shared codebase;
    receiving, by the at least one processor, information that relates to updating a first code module from among the plurality of code modules;
    determining, by the at least one processor based on the network graph, a subset of the plurality of code modules to be impacted when the first code module is updated;
    scanning, by the at least one processor, a plurality of release notes associated with the shared codebase; and
    determining, by the at least one processor based on a result of the scanning, at least one function to be changed within the determined subset of the plurality of code modules by using a natural language processing (NLP) technique,
    wherein the determined subset of the plurality of code modules includes at least one library module that is identified based on a received user input and that relates to at least one other code module within the determined subset of the plurality of code modules, and
    wherein the at least one library module is present in the determined subset of the plurality of code modules at a time when the at least one module is identified.

2. The method of claim 1, further comprising automatically updating each of the first code module and the determined subset of the plurality of code modules.

3. The method of claim 1, further comprising:
    generating a message that includes information relating to a result of the determining of the subset of the plurality of code modules; and
    transmitting the generated message to a user.

4. The method of claim 3, wherein the message includes an indication that human intervention is required for updating at least one portion of the determined subset of the plurality of code modules.

5. The method of claim 1, wherein the information that relates to updating the first code module includes information that relates to a language version of the first code module.

6. The method of claim 1, wherein the generating of the network graph comprises using an artificial intelligence technique to determine the set of dependencies.

7. The method of claim 1, further comprising:
identifying at least one additional codebase to be impacted when the first code module is updated; and
generating a notification message that includes a recommendation to update the identified at least one additional codebase.

8. A computing apparatus for updating code in a shared codebase, the computing apparatus comprising:
a processor;
a memory; and
a communication interface coupled to each of the processor and the memory,
wherein the processor is configured to:
generate a network graph that indicates a set of dependencies between a plurality of code modules included in the shared codebase;
receive, via the communication interface, information that relates to updating a first code module from among the plurality of code modules;
determine, based on the network graph, a subset of the plurality of code modules to be impacted when the first code module is updated;
scan a plurality of release notes associated with the shared codebase; and
determine, based on a result of the scan, at least one function to be changed within the determined subset of the plurality of code modules by using a natural language processing (NLP) technique,
wherein the determined subset of the plurality of code modules includes at least one library module that is identified based on a received user input and that relates to at least one other code module within the determined subset of the plurality of code modules, and
wherein the at least one library module is present in the determined subset of the plurality of code modules at a time when the at least one module is identified.

9. The computing apparatus of claim 8, wherein the processor is further configured to automatically update each of the first code module and the determined subset of the plurality of code modules.

10. The computing apparatus of claim 8, wherein the processor is further configured to:
generate a message that includes information relating to a result of the determination of the subset of the plurality of code modules; and
transmit the generated message to a user via the communication interface.

11. The computing apparatus of claim 10, wherein the message includes an indication that human intervention is required for updating at least one portion of the determined subset of the plurality of code modules.

12. The computing apparatus of claim 8, wherein the information that relates to updating the first code module includes information that relates to a language version of the first code module.

13. The computing apparatus of claim 8, wherein the processor is further configured to generate the network graph by using an artificial intelligence technique to determine the set of dependencies.

14. The computing apparatus of claim 8, wherein the processor is further configured to:
identify at least one additional codebase to be impacted when the first code module is updated; and
generate a notification message that includes a recommendation to update the identified at least one additional codebase.

* * * * *